July 8, 1952 E. J. DRAZY 2,602,919

BALANCED PARABOLIC MODULATOR

Filed Nov. 10, 1950

INVENTOR
E. J. DRAZY
BY H. A. Burgess
ATTORNEY

Patented July 8, 1952

2,602,919

UNITED STATES PATENT OFFICE 2,602,919

BALANCED PARABOLIC MODULATOR

Elbert J. Drazy, East Orange, N. J., assignor to Bell Telephone Laboratories, Incorporated, New York, N. Y., a corporation of New York Application November 10, 1950, Serial No. 195,020

5 Claims. (Cl. 332—48)

Figure 1:
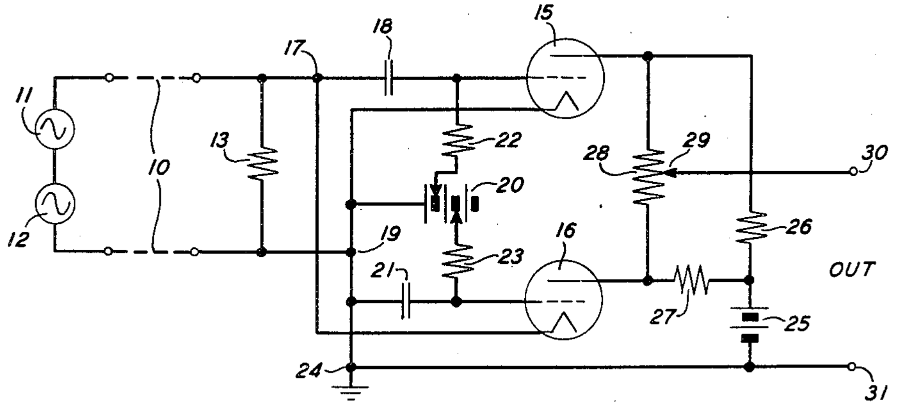

The present invention relates to a differential modulator for suppressing undesired input wave components and producing desired intermodulation components of impressed waves. The invention is useful in general for modulating purposes and especially as a broad-band modulator.

It is a general object of the invention to produce intermodulation between input waves of different frequencies while suppressing to a high degree in the output circuit all unmodulated components of the input waves.

One use to which the invention has been put is as a receiving modulator in a measuring system. Different frequency waves are received over a line from a distant point and are used to produce difference-frequency products at the receiver. In the system referred to it was necessary to achieve a high degree of suppression of noise and other waves incoming on the line that might have frequencies lying in the band of frequencies utilized for measurement purposes, as these frequencies could not be eliminated by filtering. The modulator of the invention solved this difficulty by producing output waves consisting to a high degree entirely of modulation products and containing substantially none of the unmodulated input wave components repeated into the output from the input. In this use the modulator was required to have broad-band characteristics and the use of input or output transformers was ruled out by practical considerations.

The objects and features of the invention will be more fully understood from the detailed description to follow of typical circuits as illustrated in the drawings.

Figure 2:
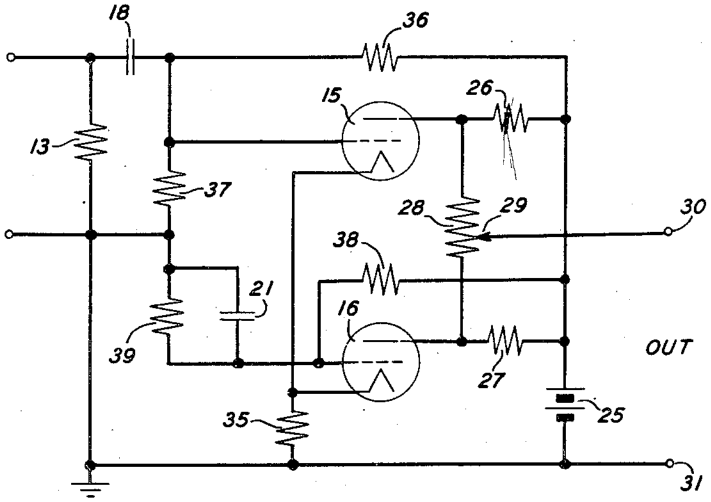

Fig. 1 is a schematic circuit diagram of one modulator according to the invention, and Fig. 2 is a similar diagram of an alternative construction according to the invention.

Waves of different frequency symbolized by the two generators 11, 12 are sent over line 10 to the receiving point where they are to be modulated against one another to produce a beat frequency to be used for measurement or signalling purposes. If one wave has a frequency $f_1$ and the other a frequency $f_2$, it may be desired to utilize at the receiver frequency $f_3=f_1-f_2$. It is understood that other frequencies than $f_1$ and $f_2$ may be used and that either frequency may be variable as may be desired. It is important that no component $f_3$ appear in the output side of the modulator except that arising from intermodulation of waves $f_1$ and $f_2$ in the modulator. Any non-linearity in circuit elements ahead of the receiver that might produce some intermodulation would result in impressing some $f_3$ component on the modulator input along with the $f_1$ and $f_2$ components, or especially where $f_3$ represents a band of frequencies, noise in the $f_3$ range may be present on line 10. In all such cases any impressed frequencies $f_3$ are to be prevented from reaching the output side of the modulator.

The modulator comprises tubes 15, 16 shown for simplicity as triodes but in practice they might more generally be pentodes. In the circuit of Fig. 1, the grid of tube 15 is connected through stopping condenser 18 to terminal 17 of line 10, shown terminated in resistor 13. The lower terminal 19 is connected through stopping condenser 21 to the grid of tube 16. Terminal 17 is also connected to the cathode of tube 16, while terminal 19 is also connected to the cathode of tube 15. Thus the input waves are applied to the grid-cathode terminals of the tubes in respectively opposite phase, or differentially.

Negative bias is applied to the grids from battery 20 over bias resistors 22 and 23 indicated as capable of separately varying the bias voltages to the best value for each tube.

Point 19 is grounded at 24 and connected to the negative terminal of plate voltage source 25 which supplies the plates through resistors 26 and 27 respectively. The output is taken between ground at 31 and a common plate terminal 30, leading from a slider 29 on resistor 28.

The plate and grid bias voltages are adjusted to the right values to cause tube 15 to operate as a square-law modulator and tube 16 as a grounded grid amplifier having the same gain. The input waves are repeated through tube 16 without phase reversal to the output terminals while the tube 15 applies to the output both first-power products reversed in phase and second-power products.

The first-power products are made to cancel in the output, the tap 29 being adjusted to secure the best result. Such second-power products as may be applied to the output through tube 16 merely add in phase to those produced in tube 15, so that tube 16 may in fact operate on a curved part of its characteristic and still serve to cancel the unmodulated output of tube 15.

In Fig. 2, the cathodes of tubes 15 and 16 are directly connected together and through a common resistor 35 to ground. The upper terminal of the input circuit is connected through stopping condenser 18 to the grid of tube 15 while the lower terminal is connected through stopping condenser 21 to the grid of tube 16. Since normal space current flow through resistor 35 raises the cathode potential above ground, the proper grid bias is obtained from the plate battery 25 by potentiometer resistances 36, 37 in the case of tube 15 and 38, 39 in the case of tube 16.

Tube 16 operates as a grounded grid amplifier, or amplifier-modulator, driven by tube 15 acting as a cathode-follower and repeats into the common output circuit input waves in such phase as to cancel those in the output of tube 15. Tube 15 supplies both waves unchanged in frequency and modulated waves. As in the case of Fig. 1, each tube can be made to supply both unmodulated and modulated waves into the common output, the former being opposed to each other in phase and the latter being in like phase since they result from square-law action in the tubes.

The circuit of Fig. 1 has a lower input impedance than the circuit of Fig. 2 and the latter is to be preferred where the circuit is to be driven from a preceding amplifier stage.

Various circuit modifications can be made without departing from the spirit or exceeding the scope of the invention.

What is claimed is:

1. A modulating circuit having an input circuit for unmodulated waves and an output circuit for modulated waves, said input circuit and said output circuit each having one side grounded and the other side ungrounded, modulating means included between said input and output circuits for producing said modulated waves, said modulating means also repeating into said output circuit unmodulated wave components with phase reversal, and a grounded grid tube included between said input and output circuits for transferring unmodulated waves into said output circuit in phase opposition to said components, said tube having its cathode connected to have impressed upon its input unmodulated waves in phase with the ungrounded side of said input circuit, and its anode connected to the ungrounded side of said output circuit.

2. A differential modulator comprising a pair of grid-controlled tubes, a circuit for impressing modulating waves of different frequency on said modulator, one terminal of said circuit connecting through a series condenser to the grid of one tube, the opposite terminal connecting to ground and through a series condenser to the grid of the other tube, cathode-to-ground connections for said tubes, providing a direct-current path for the space current of each tube and for causing said waves to appear in opposite phase across the grid-cathode terminals of the respective tubes, a common anode terminal for said tubes and an output connection for the modulation products, exclusive of the input waves, connected between ground and said common anode terminal.

3. A differential modulator according to claim 2 in which both cathodes are directly connected together and through a common impedance to ground.

4. A differential modulator according to claim 2 including a cathode-ground impedance in the cathode-ground connection of only one tube, the other cathode being grounded, and the opposite terminals of said resistor being connected across the terminals of said circuit.

5. A differential modulator comprising a pair of grid-controlled tubes, an input circuit carrying waves of different frequencies, opposite terminals of said circuit connected respectively to the grids of said tubes, one terminal only of said circuit connected directly to the minus B point and through a common resistor to the cathodes of said tubes, a common terminal for the anodes of said tubes, and an output circuit for waves representing intermodulation products of said input waves without unmodulated components thereof connected between said common terminal and the minus B point.

ELBERT J. DRAZY.

REFERENCES CITED

The following references are of record in the file of this patent:

UNITED STATES PATENTS

| Number | Name | Date |
|---|---|---|
| 2,120,882 | Ballantine | June 14, 1938 |
| 2,429,755 | Hallmark | Oct. 28, 1947 |
| 2,476,875 | Ketchledge | July 19, 1949 |
| 2,521,116 | Doba | Sept. 5, 1950 |